US012501086B2

(12) United States Patent
Mirecki et al.

(10) Patent No.: US 12,501,086 B2
(45) Date of Patent: Dec. 16, 2025

(54) SERVER-GENERATED MOSAIC VIDEO STREAM FOR LIVE-STREAM MEDIA ITEMS

(71) Applicant: Google LLC, Mountain View, CA (US)

(72) Inventors: Brianne Courtney Mirecki, Culver City, CA (US); Mayank Prakash Mohta, San Jose, CA (US); James Futrell, Summit, NJ (US); Kong Man Cheung, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/120,947

(22) Filed: Mar. 13, 2023

(65) Prior Publication Data

US 2024/0314373 A1 Sep. 19, 2024

(51) Int. Cl.
*H04N 21/2365* (2011.01)
*H04N 21/2187* (2011.01)
(Continued)

(52) U.S. Cl.
CPC ..... *H04N 21/2365* (2013.01); *H04N 21/2187* (2013.01); *H04N 21/2368* (2013.01); *H04N 21/439* (2013.01); *H04N 21/44222* (2013.01); *H04N 21/4627* (2013.01); *H04N 21/472* (2013.01); *H04N 21/4858* (2013.01); *H04N 21/4884* (2013.01)

(58) Field of Classification Search
CPC ........... H04N 21/2365; H04N 21/2187; H04N 21/2368; H04N 21/439; H04N 21/44222; H04N 21/4627; H04N 21/472; H04N 21/4858; H04N 21/4884
See application file for complete search history.

(56) References Cited

U.S. PATENT DOCUMENTS

2003/0014752 A1\* 1/2003 Zaslavsky .............. H04N 21/47
725/38
2007/0011702 A1 1/2007 Vaysman
(Continued)

FOREIGN PATENT DOCUMENTS

TW 201225645 A 6/2012
WO 2018072184 A1 4/2018

OTHER PUBLICATIONS

International Search Report and Written Opinion for International Application No. PCT/US2024/019598, mailed Jul. 17, 2024, 13 pages.

(Continued)

*Primary Examiner* — Kunal Langhnoja
(74) *Attorney, Agent, or Firm* — Lowenstein Sandler LLP

(57) ABSTRACT

Methods and systems for a server-generated mosaic video stream of live-stream media items are provided herein. A plurality of source video streams is identified by a server. The plurality of source video streams are combined into a mosaic video stream, wherein each source video stream of the plurality of source video streams occupies a corresponding spatial fragment of a predefined shape within a visual rendering of the mosaic video stream, and wherein video frames of the plurality of source video streams are simultaneously present within the mosaic video stream. The mosaic video stream is transmitted to a client device for decoding and visual rendering within an output window.

20 Claims, 6 Drawing Sheets

(51) Int. Cl.
     *H04N 21/2368*    (2011.01)
     *H04N 21/439*     (2011.01)
     *H04N 21/442*     (2011.01)
     *H04N 21/4627*    (2011.01)
     *H04N 21/472*     (2011.01)
     *H04N 21/485*     (2011.01)
     *H04N 21/488*     (2011.01)

(56) References Cited

U.S. PATENT DOCUMENTS

| | | |
|---|---|---|
| 2007/0016925 A1 | 1/2007 | Vaysman et al. |
| 2008/0060005 A1 | 3/2008 | Shanks et al. |
| 2008/0216127 A1 | 9/2008 | Shanks |
| 2011/0202960 A1* | 8/2011 | Vaysman ............ H04N 21/4316 725/41 |
| 2015/0296247 A1* | 10/2015 | Glasser .............. H04N 21/4325 725/74 |
| 2018/0242028 A1 | 8/2018 | Van Brandenburg et al. |

OTHER PUBLICATIONS

Office Action for Taiwan Patent Application No. 113109190, mailed Oct. 23, 2024, 14 Pages.

\* cited by examiner

Media Item 201B

SERVER-GENERATED MOSAIC VIDEO STREAM FOR LIVE-STREAM MEDIA ITEMS

TECHNICAL FIELD

Aspects and implementations of the present disclosure relate to server-generated mosaic video streams for live-stream media items.

BACKGROUND

Content delivery platforms connecting via the Internet allow users to connect to and share information with each other. Many content delivery platforms include a content sharing aspect that allows users to upload, view, and share content, such as video items, image items, audio items, and so on. Other users of the content delivery platform may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes identifying, by a server, a plurality of source video streams. The method further includes combining the plurality of source video streams into a mosaic video stream, where each source video stream of the plurality of source video streams occupies a corresponding spatial fragment of a predefined shape within a visual rendering of the mosaic video stream, and where the video frames of the plurality of source video streams are simultaneously present within the mosaic video stream. The method further includes transmitting the mosaic video stream to a client device for decoding and visual rendering within an output window.

In some implementations, each source video stream of the plurality of source video streams is associated with a corresponding set of audio tracks. The method further includes receiving, from the client device, an audio track selection specifying an audio track of a set of audio tracks associated with a selected source video stream and incorporating the specified audio track into the mosaic video stream. In some implementations, the method further includes providing a visual cue indicating that the specified audio track is associated with the selected source video stream. In some implementations, the method further includes receiving, from the client device, a full screen mode selection specifying a source video stream of the plurality of source video streams. The method further includes expanding, to a full screen mode, a spatial fragment occupied by the specified source video stream within the visual rendering of the mosaic video stream. In some implementations, the method further includes receiving, from the client device, a full screen mode cancelation command. The method further includes restoring, to corresponding original size and position, the spatial fragment occupied by the specified source video stream within the visual rendering of the mosaic video stream. In some implementations, the method further includes receiving, from the client device, a closed caption selection specifying a closed caption type associated with a selected source video stream. The method further includes incorporating, into the mosaic video stream, closed captions of the specified closed caption type for the selected source video stream.

In some implementations, combining the plurality of source video streams into the mosaic video stream is performed in response to receiving, from the client device, identifiers of the plurality of source video streams. In some implementations, to combine the plurality of source video streams into the mosaic video stream, the method further includes verifying access rights of a user of the client device with respect to each source video stream of the plurality of source video streams. In some implementations, to combine the plurality of source video streams into the mosaic video stream, the method further includes receiving, from the client device, an identifier of a first source video stream of the plurality of source video streams. The method further includes determining a first language associated with a first audio track of the first source video stream. The method further includes identifying a second source video stream of the plurality of source video streams that has a second audio track associated with a second language that is different from the first language. The method further includes switching the second audio track associated with the second language to a third audio track associated with the first language.

In some implementations, the method further includes receiving, from the client device, an identifier of each of the plurality of source video streams. The method further includes determining that one of the plurality of source video streams is unavailable for playback. The method further includes sending an error message to the client device, and requesting that the unavailable source video stream be replaced with a different source video stream.

In some implementations, the mosaic video stream is presented within the output window with graphical user interface (GUI) elements selectable to request one or more of an audio track of a set of audio tracks with a selected source video stream, a closed caption type associated with a selected source video stream, a full screen mode for a selected source video stream, or a full screen mode cancelation for canceling the full screen mode for the selected source video stream.

In some implementations, to identify the plurality of source video streams, the method further includes determining user behavior with respect to the plurality of source video streams. The method further includes, based on the user behavior, prompting a user to create the mosaic video stream from the plurality of source video streams. The method further includes receiving a confirmation of the user to create the mosaic video stream from the plurality of source video streams. The user behavior includes a user switching between the plurality of source video streams more than a threshold number of times.

An aspect of the disclosure provides a system including a memory device and a processing device communicatively coupled to the memory device. The processing device performs operations including identifying, by a server, a plurality of source video streams. The operations further include combining the plurality of source video streams into a mosaic video stream, where each source video stream of the plurality of source video streams occupies a corresponding spatial fragment of a predefined shape within a visual rendering of the mosaic video stream, and where the video frames of the plurality of source video streams are simultaneously present within the mosaic video stream. The operations further include transmitting the mosaic video stream to a client device for decoding and visual rendering within an output window.

In some implementations, each source video stream of the plurality of source video streams is associated with a corresponding set of audio tracks. The operations further include receiving, from the client device, an audio track selection specifying an audio track of a set of audio tracks associated with a selected source video stream and incorporating the specified audio track into the mosaic video stream. In some implementations, the operations further include providing a visual cue indicating that the specified audio track is associated with the selected source video stream. In some implementations, the operations further include receiving, from the client device, a full screen mode selection specifying a source video stream of the plurality of source video streams. The operations further include expanding, to a full screen mode, a spatial fragment occupied by the specified source video stream within the visual rendering of the mosaic video stream. In some implementations, the operations further include receiving, from the client device, a full screen mode cancelation command. The operations further include restoring, to corresponding original size and position, the spatial fragment occupied by the specified source video stream within the visual rendering of the mosaic video stream. In some implementations, the operations further include receiving, from the client device, a closed caption selection specifying a closed caption type associated with a selected source video stream. The operations further include incorporating, into the mosaic video stream, closed captions of the specified closed caption type for the selected source video stream.

In some implementations, combining the plurality of source video streams into the mosaic video stream is performed in response to receiving, from the client device, identifiers of the plurality of source video streams. In some implementations, to combine the plurality of source video streams into the mosaic video stream, the operations further include verifying access rights of a user of the client device with respect to each source video stream of the plurality of source video streams. In some implementations, to combine the plurality of source video streams into the mosaic video stream, the operations further include receiving, from the client device, an identifier of a first source video stream of the plurality of source video streams. The operations further include determining a first language associated with a first audio track of the first source video stream. The operations further include identifying a second source video stream of the plurality of source video streams that has a second audio track associated with a second language that is different from the first language. The operations further include switching the second audio track associated with the second language to a third audio track associated with the first language.

In some implementations, the operations further include receiving, from the client device, an identifier of each of the plurality of source video streams. The method further includes determining that one of the plurality of source video streams is unavailable for playback. The operations further include sending an error message to the client device, and requesting that the unavailable source video stream be replaced with a different source video stream.

In some implementations, the mosaic video stream is presented within the output window with graphical user interface (GUI) elements selectable to request one or more of an audio track of a set of audio tracks with a selected source video stream, a closed caption type associated with a selected source video stream, a full screen mode for a selected source video stream, or a full screen mode cancelation for canceling the full screen mode for the selected source video stream.

In some implementations, to identify the plurality of source video streams, the operations further include determining user behavior with respect to the plurality of source video streams. The operations further include, based on the user behavior, prompting a user to create the mosaic video stream from the plurality of source video streams. The operations further include receiving a confirmation of the user to create the mosaic video stream from the plurality of source video streams. The user behavior includes a user switching between the plurality of source video streams more than a threshold number of times.

An aspect of the disclosure provides a computer program including instructions that, when the program is executed by a processing device, cause the processing device to perform operations including identifying, by a server, a plurality of source video streams. The operations further include combining the plurality of source video streams into a mosaic video stream, where each source video stream of the plurality of source video streams occupies a corresponding spatial fragment of a predefined shape within a visual rendering of the mosaic video stream, and where the video frames of the plurality of source video streams are simultaneously present within the mosaic video stream. The operations further include transmitting the mosaic video stream to a client device for decoding and visual rendering within an output window.

In some implementations, each source video stream of the plurality of source video streams is associated with a corresponding set of audio tracks. The operations further include receiving, from the client device, an audio track selection specifying an audio track of a set of audio tracks associated with a selected source video stream and incorporating the specified audio track into the mosaic video stream. In some implementations, the operations further include providing a visual cue indicating that the specified audio track is associated with the selected source video stream. In some implementations, the operations further include receiving, from the client device, a full screen mode selection specifying a source video stream of the plurality of source video streams. The operations further include expanding, to a full screen mode, a spatial fragment occupied by the specified source video stream within the visual rendering of the mosaic video stream. In some implementations, the operations further include receiving, from the client device, a full screen mode cancelation command. The operations further include restoring, to corresponding original size and position, the spatial fragment occupied by the specified source video stream within the visual rendering of the mosaic video stream. In some implementations, the operations further include receiving, from the client device, a closed caption selection specifying a closed caption type associated with a selected source video stream. The operations further include incorporating, into the mosaic video stream, closed captions of the specified closed caption type for the selected source video stream.

In some implementations, combining the plurality of source video streams into the mosaic video stream is performed in response to receiving, from the client device, identifiers of the plurality of source video streams. In some implementations, to combine the plurality of source video streams into the mosaic video stream, the operations further include verifying access rights of a user of the client device with respect to each source video stream of the plurality of source video streams. In some implementations, to combine the plurality of source video streams into the mosaic video stream, the operations further include receiving, from the client device, an identifier of a first source video stream of the plurality of source video streams. The operations further include determining a first language associated with a first audio track of the first source video stream. The operations further include identifying a second source video stream of the plurality of source video streams that has a second audio track associated with a second language that is different from the first language. The operations further include switching the second audio track associated with the second language to a third audio track associated with the first language.

In some implementations, the operations further include receiving, from the client device, an identifier of each of the plurality of source video streams. The method further includes determining that one of the plurality of source video streams is unavailable for playback. The operations further include sending an error message to the client device, and requesting that the unavailable source video stream be replaced with a different source video stream.

In some implementations, the mosaic video stream is presented within the output window with graphical user interface (GUI) elements selectable to request one or more of an audio track of a set of audio tracks with a selected source video stream, a closed caption type associated with a selected source video stream, a full screen mode for a selected source video stream, or a full screen mode cancelation for canceling the full screen mode for the selected source video stream.

In some implementations, to identify the plurality of source video streams, the operations further include determining user behavior with respect to the plurality of source video streams. The operations further include, based on the user behavior, prompting a user to create the mosaic video stream from the plurality of source video streams. The operations further include receiving a confirmation of the user to create the mosaic video stream from the plurality of source video streams. The user behavior includes a user switching between the plurality of source video streams more than a threshold number of times.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
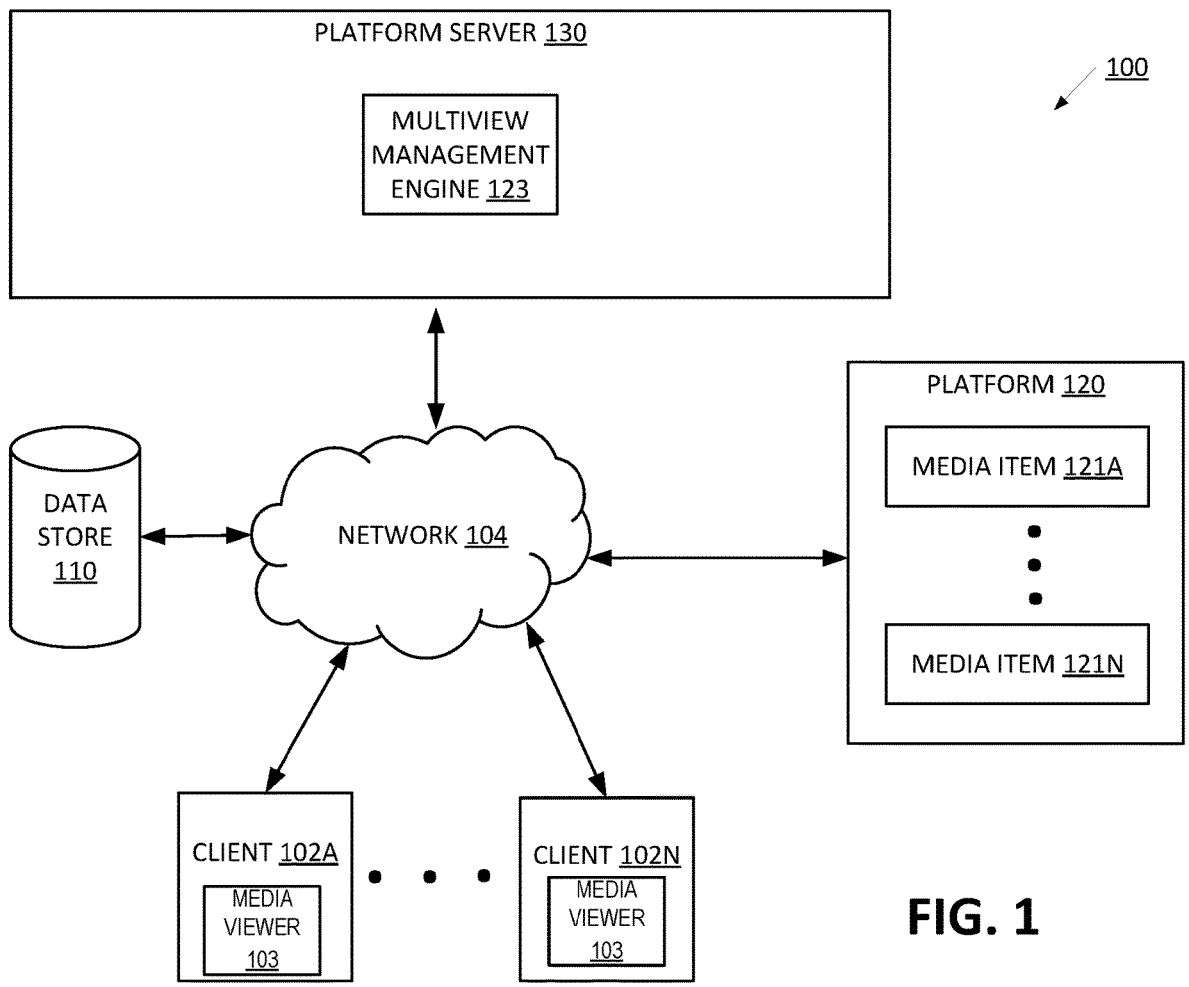
FIG. 1 illustrates an example system architecture, in accordance with implementations of the present disclosure.

Aspects of the present disclosure relate to providing server-generated mosaic video streams for live-stream media items. A platform (e.g., a content platform, etc.) can enable a user to access a media item (e.g., a video item, an audio item, etc.) provided by another user of the platform. For example, a first user of a content platform can provide (e.g., upload) a media item to a content platform via a graphical user interface (GUI) provided by the content platform to a client device associated with the first user. A second user of the content platform can access the media item provided by the first user via a content platform GUI at a client device associated with the second user.

The content delivery platform can stream media items, such as live-stream video items, to one or more client devices for consumption by users. A live-stream media item may refer to a live broadcast or transmission of a live event, where the media item is concurrently transmitted, at least in part, as the event occurs, and where the media item is not available in its entirety when the transmission of the media item starts. A media item can include a plurality of frames, where each frame comprises video data (and, optionally, audio data) that can be rendered at an instant in time. The content delivery platform can receive a live-stream media item from a source entity, such as a content owner or content distributor.

Content owners and/or content distributors typically transmit live-stream video items by delivering video content (e.g., a video signal of the video content) to a video player. The video signal may be provided in an uncompressed file format, such as a serial digital interface (SDI) format, or in a compressed format, such as a Moving Picture Experts Group (MPEG) file format or Transport Stream (TS) file format. The video signal is sent to an encoder which converts the file into a live streaming signal. The live streaming signal may be a segmented data stream that may be transmitted using Hypertext Transport Protocol (HTTP). The live streaming signal may include multiple streams, where each stream may have a different data rate and/or a different resolution. Two common formats for the live streaming signal include HTTP Live Stream (HLS) implemented by Apple® and MPEG-Dynamic Adaptive Bitrate Streaming over HTTP (MPEG-DASH) implemented, for example, by web browsers such as Chrome®, Microsoft Edge®, and Firefox®. In addition to the segmented data stream, the encoder may optionally generate a manifest file. The manifest file contains information for a video player to play the segmented data stream such as the data rate and resolution of each stream and a playlist providing an address from which the video content may be retrieved. The encoder may optionally generate a single manifest file for each encoded video signal, where the manifest file can be stored at a manifest server or distributed along with the streaming signal.

The live streaming signal and optionally the manifest file can be stored in one or more content delivery networks (CDN). Each CDN includes a number of edge servers which can store the streaming signal and optionally the manifest file until requested by a video player. When the streaming signal is provided to multiple CDNs, the CDNs may be in different geographic locations, such as the West Coast, East Coast, Midwest, etc. Each video player may select a CDN based, among other things, on its geographic proximity in order to reduce transmission latencies.

In some instances, a user may want to watch multiple live-stream media items simultaneously. For example, a user may want to watch two or more live-stream video items, such as two or more major sports games that are being broadcasted or transmitted live at the same time. Certain devices enable users to watch multiple live-stream media items simultaneously by allowing multiple videos to play at once, using, for example, picture-in-picture (PiP) mode. However, simultaneous streaming and rendering of multiple live-stream media items may consume significant processing resources to support the above interactions between the video player and/or the decoder on the client device, the CDN servers and optionally the manifest server, causing significant latency in presenting multiple live-stream media items and negatively impacting the overall performance of relevant client application(s). Furthermore, in some instances, client devices may not be capable of streaming more than one live-stream media item at the same time due to hardware capabilities. For example, such client devices can be configured with hardware that can only support up to a single video decoder. A video decoder is an electronic circuit that can convert the encoded live streaming signal into audio and/or video for display on a device.

Aspects of the present disclosure address the above and other deficiencies by providing a server-generated mosaic video stream for live-stream media items. Media item creator(s) can provide live-stream media items to a platform for access by one or more users of the platform. Each live-stream media item can correspond to a video stream. A server can identify a set of source video streams that can be combined (e.g., stitched together) at the server into a mosaic video stream, and the mosaic video stream can be transmitted to a client device for presentation as a single live-stream media item. Each source video stream of the set of source video streams can occupy a corresponding spatial fragment of a predefined shape within a visual rendering of the mosaic video stream, and the video frames of the set of source video streams can be simultaneously present within the mosaic video stream. In some embodiments, each source video stream can be associated with a set of audio tracks (e.g., an English audio track, a Spanish audio track, etc.). In some embodiments, an audio track selection specifying an audio track of the set of audio tracks can be received from the client device for the mosaic video stream. This selection can identify a language to use for an audio track of the mosaic video stream or indicate that a current or default audio track of a selected source video stream should be used for the mosaic video stream. The specified audio track can then be incorporated into the mosaic video stream. In some embodiments, a visual cue can be provided on the mosaic video stream that indicates that the specified audio track is associated with the selected source video stream.

In some embodiments, when the mosaic video stream is presented, a full screen mode selection specifying one of the source video streams in the visual rendering of the mosaic video stream can be received from the client device. In response, a spatial fragment occupied by the specified source video stream can be expanded to a full screen mode within the visual rendering of the mosaic video stream. In some embodiments, a full screen mode cancellation command can be received from the client device. In response, the spatial fragment occupied by the specified source video stream within the visual rendering of the mosaic video stream can be restored to its corresponding original size and position. In some embodiments, a closed caption selection specifying a closed caption type (e.g., an English caption track, a Spanish caption track, etc.) associated with a selected source video stream can be received from the client device. In response, the closed captions of the specified closed caption type for the selected source video stream can be incorporated into the mosaic video stream.

In some embodiments, the set of source video streams can be combined into the mosaic video stream in response to receiving, from the client device, identifiers of the set of source video streams. In some embodiments, combining the set of source video streams into the mosaic video stream can include verifying access rights of a user of the client device with respect to each source video stream of the set of source video streams.

In some embodiments, an audio track of one or more source video streams in the mosaic video stream can be modified. For example, the language associated with an audio track of the first source video stream can be different from the language associated with an audio track of the second source video stream. Upon identifying this difference, the audio track of the second source video stream can be switched to another audio track associated with the language of the audio track of the first video stream.

In some embodiments, when receiving identifiers of source video streams for the mosaic video stream, it can be determined that one of the source video streams is unavailable for playback (e.g., due to its unavailability in a geographic region where the user is currently located). In response to determining that one of the set of source video streams is unavailable for playback, an error message can be sent to the client device, where the error message can include a request that the unavailable source video stream be replaced with a different source video stream.

In some embodiments, the mosaic video stream is presented within the output window with graphical user interface (GUI) elements. For example, the GUI elements can include one or more controls (e.g., a scroll bar, a button, etc.). The GUI elements can be selectable to request, for the mosaic video stream, an audio track of tracks associated with a selected source video stream, a closed caption type associated with a selected source video stream, a full screen mode for a selected source video stream, and/or a full screen mode cancelation for canceling the full screen mode for the selected source video stream.

In some embodiments, rather than relying on user input identifying the source video streams for the mosaic video stream, the source video streams for the mosaic video stream can be identified automatically based on user behavior with respect to the source video streams. For example, it can be detected that the user has been switching between some source video streams or between different channels including source video streams (e.g., the user has done it for more than a threshold number of times). Based on the user behavior, a user can be offered to create the mosaic video stream from the automatically identified source video streams that the user has been switching between. Upon the user's confirmation of the proposed combination of the automatically identified source video streams, the mosaic video stream can be created from these source video streams. If the user has been switching between different channels, a source video stream can be selected from each of these channels based on popularity of video streams in the channel, topics associated with the video streams in the channels, and/or various factors.

Aspects of the present disclosure provide technical advantages over previous solutions. As described above, streaming multiple video streams from the server for combination on the client device consumes significant processing resources and can cause noticeable latency. Furthermore, certain devices may not be capable of streaming more than one live-stream media item at the same time due to hardware capabilities that typically only support a single video decoder. By combining live-stream media items into a mosaic video stream on the server and then sending the mosaic video stream to the device for access by users, consumption of processing resources and latency can be reduced, and users can watch multiple live-stream media items concurrently without the need for additional hardware support (e.g., users can access the multiple live-stream media items simultaneously on devices with hardware capabilities that only support one video decoder). Further, by maintaining a separation of other data associated with each live-stream media item, such as audio, closed captions, etc., users can watch multiple live-stream media items at the same time while having the capability to switch the audio between each live-stream media item, change the size of the presentation of each live-stream media item, enable the closed captions on a particular live-stream media item, etc.

FIG. 1 illustrates an example system architecture 100, in accordance with implementations of the present disclosure. The system architecture 100 (also referred to as "system" herein) includes client devices 102A-N, a data store 110, a platform 120, and/or a platform server 130 each connected to a network 104. In implementations, network 104 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document and/or a file displayed via a graphical user interface (GUI) on a client device 102, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 104.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Client devices 102A-N can include a media viewer 103. In some implementations, a media viewer can be an application that provides a user interface (UI) for users to view or upload content, such as images, video items, web pages, documents, etc. For example, the media viewer 103 can be a web browser that can access, retrieve, present, and/or navigate content (e.g., web pages such as Hyper Text Markup Language (HTML) pages, digital media items, etc.) served by a web server. The media viewer 103 can render, display, and/or present the content to a user. The media viewer 103 can also include an embedded media player (e.g., a Flash® player or an HTML5 player) that is embedded in a web page (e.g., a web page that may provide information about a product sold by an online merchant). In another example, the media viewer 103 can be a standalone application (e.g., a mobile application or app) that allows users to view digital media items (e.g., digital video items, digital images, electronic books, etc.). According to aspects of the disclosure, the media viewer 103 can be a content platform application for users to record, edit, and/or upload content for sharing on platform 120. As such, the media viewer 103 and/or the UI associated with the media viewer 103 can be provided to client devices 102A-N by platform 120. In one example, the media viewer 103 may be an embedded media player that is embedded in web pages provided by the platform 120.

A media item 121 can be consumed via the Internet or via a mobile device application, such as a media viewer 103 of client devices 102A-N. In some embodiments, a media item 121 can correspond to a media file (e.g., a video file, an audio file, a video stream, an audio stream, a live-stream, etc.). In other or similar embodiments, a media item 121 can correspond to a portion of a media file (e.g., a portion or a chunk of a video file, an audio file, etc.). As discussed previously, a media item 121 can be requested for presentation to the user by the user of the platform 120. As used herein, "media," media item," "online media item," "digital media," "digital media item," "content," and "content item" can include an electronic file that can be executed or loaded using software, firmware or hardware configured to present the digital media item to an entity. As indicated above, the platform 120 can store the media items 121, or references to the media items 121, using the data store 110, in at least one implementation. In another implementation, the platform 120 can store media item 121 or fingerprints as electronic files in one or more formats using data store 110. Platform 120 can provide media item 121 to a user associated with a client device 102A-N by allowing access to media item 121 (e.g., via a content platform application), transmitting the media item 121 to the client device 102, and/or presenting or permitting presentation of the media item 121 via client device 102.

In some embodiments, media item 121 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, live-stream media items, or any set of images (e.g., animated images, non-animated images, etc.) to be displayed in sequence. In some embodiments, a video item can be stored (e.g., at data store 110) as a video file that includes a video component and an audio component. The video component can include video data that corresponds to one or more sequential video frames of the video item. The audio component can include audio data that corresponds to the video data.

Platform 120 can include multiple channels (e.g., channels A through Z). A channel can include one or more media items 121 available from a common source or media items 121 having a common topic, theme, or substance. Media item 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

In some embodiments, system 100 can include one or more third party platforms (not shown). In some embodiments, a third-party platform can provide other services associated with media items 121. For example, a third-party platform can include an advertisement platform that can provide video and/or audio advertisements. In another example, a third-party platform can be a video streaming service provider that produces a media streaming service via a communication application for users to play videos, TV shows, video clips, audio, audio clips, and movies, on client devices 102 via the third-party platform.

In some embodiments, a client device 102 can transmit a request to platform server 130 for access to a media item 121. Platform server 130 may identify the media item 121 of the request (e.g., at data store 110, etc.) and may provide access to the media item 121 via the UI of the media viewer 103 provided by platform 120. In some embodiments, the requested media item 121 may have been generated by another client device 102 connected to platform server 130. For example, client device 102A can generate a video item (e.g., via an audiovisual component, such as a camera, of client device 102A) and provide the generated video item to platform 120 (e.g., via network 108) to be accessible by other users of the platform. In other or similar embodiments, the requested media item 121 may have been generated using another device (e.g., that is separate or distinct from client device 102A) and transmitted to client device 102A (e.g., via a network, via a bus, etc.). Client device 102A can provide the video item to platform 120 (e.g., via network 108) to be accessible by other users of the platform, as described above. Another client device, such as client device 102N, can transmit the request to platform server 130 (e.g., via network 108) to access the video item provided by client device 102A, in accordance with the previously provided examples.

As illustrated in FIG. 1, platform server 130 can include a multiview management engine 123. Multiview management engine 123 can be configured to create a mosaic video stream from a set of live-stream media items. Each live-stream media item can correspond to a video stream. Multiview management engine 123 can identify a set of source video streams (e.g., a set of source video streams corresponding to the set of live-stream media items) based on user input or automatically (without user input) e.g., based on user behavior, other users' requests for mosaic video streams, predefined factors for selecting source video streams, etc. Multiview management engine 123 can combine the set of source video streams (e.g., by stitching together) at the server into a mosaic video stream, and transmit the mosaic video stream to a client device for presentation as a single live-stream media item. Each source video stream of the set of source video streams can occupy a corresponding spatial fragment of a predefined shape within a visual rendering of the mosaic video stream, and the video frames of the set of source video streams can be simultaneously present within the mosaic video stream. Each source video stream can be associated with a set of audio tracks (e.g., an English audio track, a Spanish audio track, etc.).

In some embodiments, multiview management engine 123 may receive, from the client device, an audio track selection specifying an audio track of the set of audio tracks associated with a selected source video stream, and incorporate the specified audio track into the mosaic video stream. Additionally, a visual cue can be optionally provided on the mosaic video stream that indicates that the audio track for the mosaic video stream is associated with the specific source video stream.

In some embodiments, multiview management engine 123 may receive, from the client device, a full screen mode selection specifying a source video stream of the set of source video streams. In response, a spatial fragment occupied by the specified source video stream can be expanded to a full screen mode within the visual rendering of the mosaic video stream. In some embodiments, multiview management engine 123 may receive, from the client device, a full screen mode cancellation command. In response, the spatial fragment occupied by the specified source video stream within the visual rendering of the mosaic video stream can be restored to its corresponding original size and position.

In some embodiments, multiview management engine 123 may receive, from the client device, a closed caption selection specifying a closed caption type (e.g., an English caption track, a Spanish caption track, etc.) associated with a selected source video stream. In response, the closed captions of the specified closed caption type for the selected source video stream can be incorporated into the mosaic video stream.

In some embodiments, multiview management engine 123 combines the set of source video streams into the mosaic video stream in response to receiving, from the client device, identifiers of the set of source video streams. In some embodiments, combining the set of source video streams into the mosaic video stream can include verifying access rights of a user of the client device with respect to each source video stream of the set of source video streams.

In some embodiments, multiview management engine 123 combines the set of source video streams into the mosaic video stream in response to receiving, from the client device, an identifier of a first source video stream of the set of source video streams. In response, multiview management engine 123 can determine the language associated with an audio track of the first source video stream, and also determine that a second source video stream of the set of source video streams has an audio track associated with the language that is different from the language of the audio track of the first source video stream. Based on this determination, multiview management engine 123 can switch the audio track of the second source video stream to another audio track associated with the same language as the language of the audio track of the first source video stream.

In some embodiments, multiview management engine 123 can receive, from the client device, an identifier of each of the set of source video streams, and determine whether each of the set of source video streams is available for playback. In response to determining that one of the set of source video streams is unavailable for playback, multiview management engine 123 can send an error message to the client device, where the error message may include a request that the unavailable source video stream be replaced with a different source video stream.

In some embodiments, the mosaic video stream is presented within the output window with graphical user interface (GUI) elements. For example, the GUI elements can include one or more controls (e.g., a scroll bar, a button, etc.). The GUI elements can be selectable to request, for example, an audio track of a set of audio tracks associated with a selected source video stream, a closed caption type associated with a selected source video stream, a full screen mode for a selected source video stream, or a full screen mode cancelation for canceling the full screen mode for the selected source video stream.

In some embodiments, multiview management engine 123 can automatically identify the set of source video streams for the mosaic video stream. For example, multiview management engine 123 can do this by determining user behavior with respect to the set of source video streams. Based on the user behavior, a user can be prompted to create the mosaic video stream from the set of source video streams, and in response to the user confirmation to create the mosaic video stream from the set of source video streams, the mosaic video stream can be created. In some embodiments, the user behavior can include a user switching between the set of source video streams more than a threshold number of times.

In some embodiments, a client device 102 can transmit a request to access media item 121, as described above. In response to receiving a request to access media item 121, platform 120 can provide the media item 121 for presentation via the platform UI at client device 102.

It should be noted that although FIG. 1 illustrates multiview management engine 123 as part of platform server 130, in additional or alternative embodiments, multiview management engine 123 can reside on one or more server machines that are remote from platform server 130.

It should be noted that in some other implementations, the functions of platform server 130 and/or platform 120 can be provided by a fewer number of machines. For example, in some implementations, components and/or modules of any of platform server 130 and/or platform 120 may be integrated into a single machine, while in other implementations components and/or modules of any of platform server 130 and/or platform 120 may be integrated into multiple machines. In addition, in some implementations, components and/or modules of any of platform server 130 and/or platform 120 may be integrated into platform 120.

In general, functions described in implementations as being performed by platform 120 and/or platform server 130 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites. In addition, some portions of the present disclosure are described with reference to video items including live-stream video items and live video streams. It should be noted that the present disclosure is not limited to such video items, and can also cover audio items (including, for example, live-stream audio items) or any other types of media items.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2A:
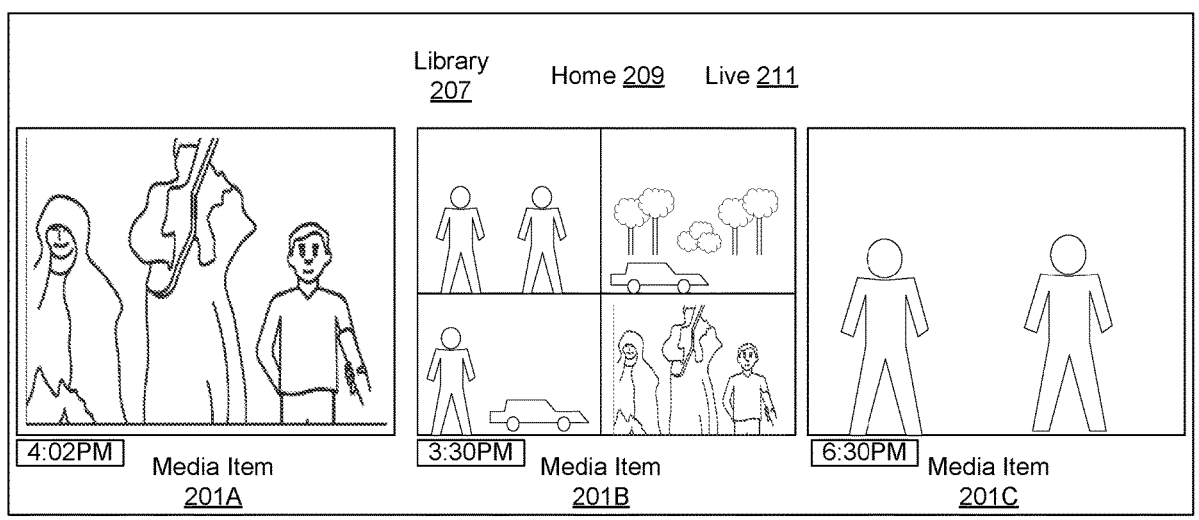
FIGS. 2A-2C illustrate example user interfaces for presenting and modifying a server-generated mosaic video stream of live-stream video items, in accordance with implementations of the present disclosure.
Figure 2B:
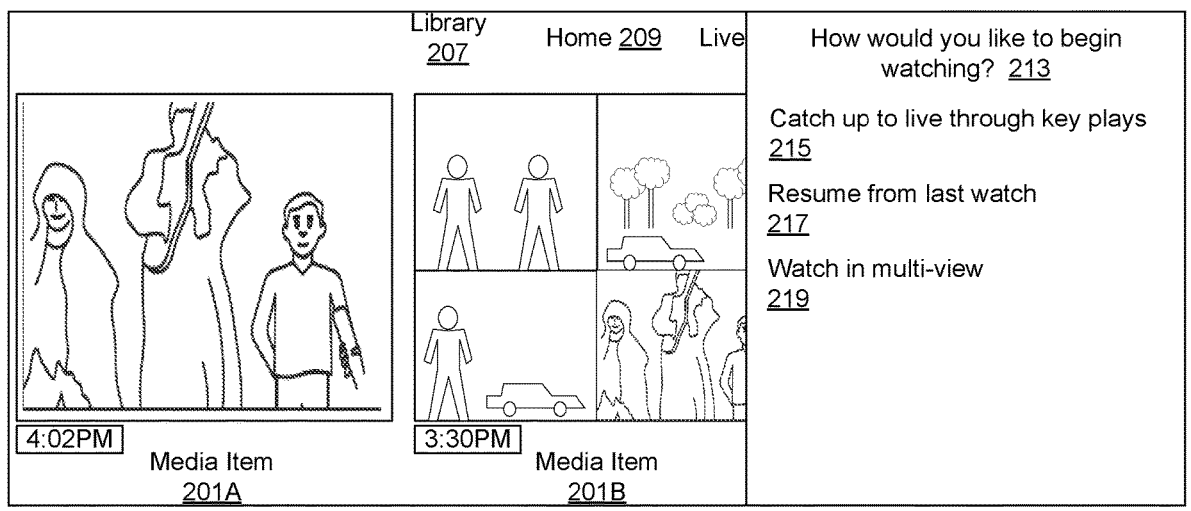
Figure 2C:
Figure 2C:
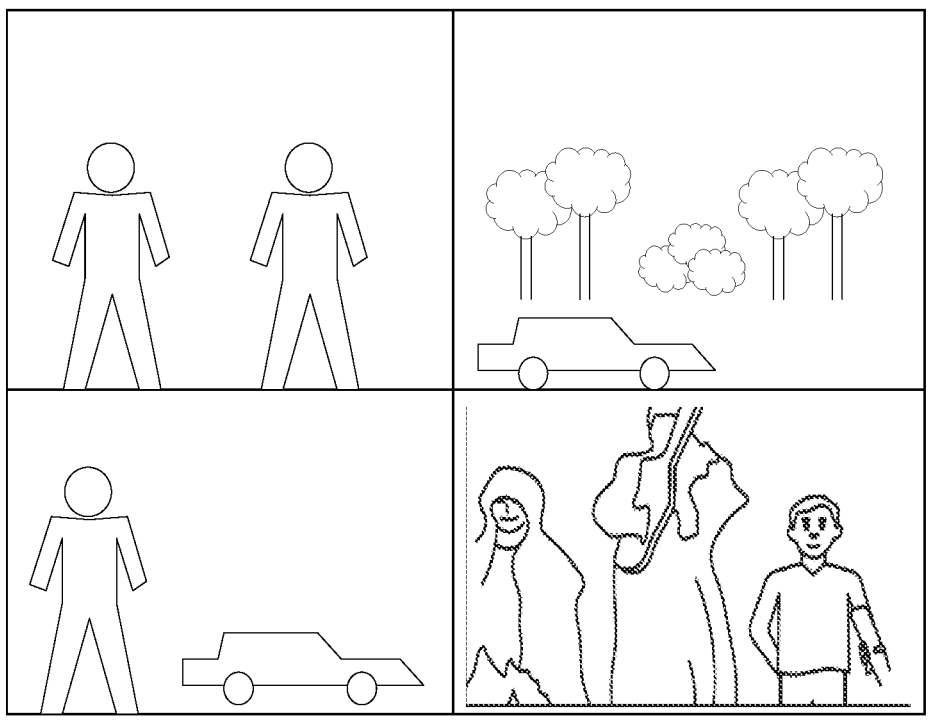

FIGS. 2A-2C illustrate example user interfaces for presenting and modifying a server-generated mosaic video stream of live-stream media items, in accordance with implementations of the present disclosure. FIGS. 2A-2C are described with reference to FIG. 3 herein below.

Figure 3:
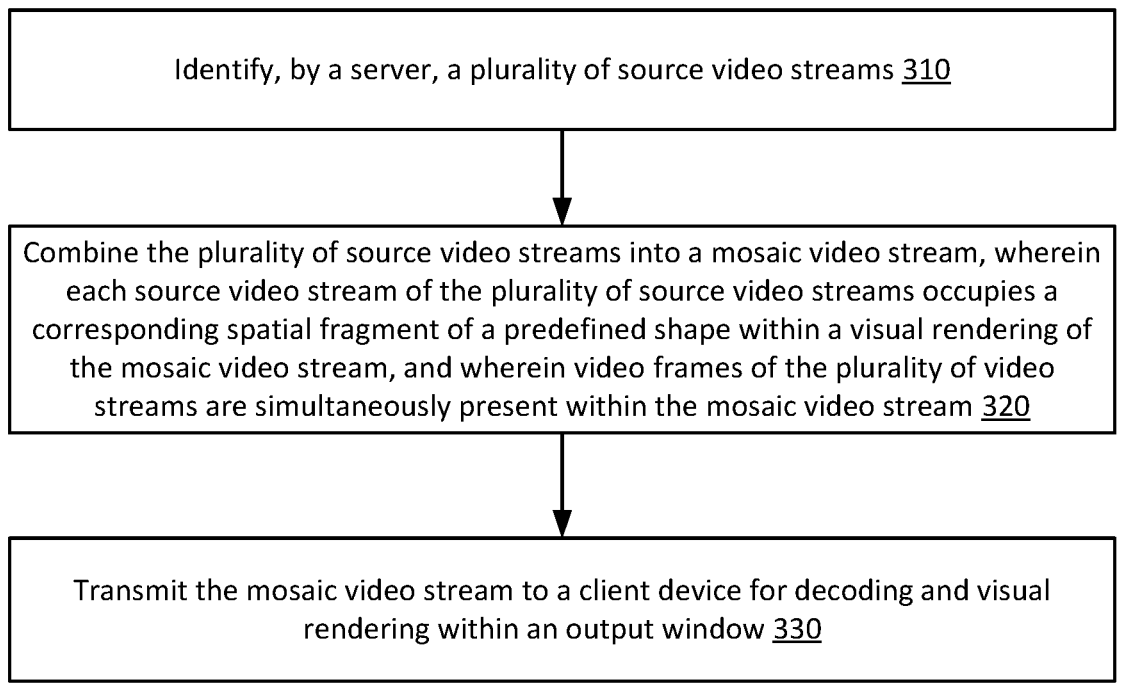
FIG. 3 depicts a flow diagram of an example method for providing a server-generated mosaic video stream of live-stream media items, in accordance with implementations of the present disclosure.

FIG. 3 depicts a flow diagram of an example method for providing a server-generated mosaic video stream of live-stream media items, in accordance with implementations of the present disclosure. Method 300 can be performed by processing logic that can include hardware (circuitry, dedicated logic, etc.), software (e.g., instructions run on a processing device), or a combination thereof. In one implementation, some or all of the operations of method 300 can be performed by one or more components of system 100 of FIG. 1. In some embodiments, some or all of the operations of method 300 can be performed by multiview management engine 123, as described above.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

In some embodiments, at block 310, the processing logic implementing method 300 identifies, by a server (e.g., the platform server 130 of FIG. 1) a set of source video streams (e.g., a set of source video streams of each media item 121A to media item 121N of FIG. 1). In some embodiments, each media item can be a video item and/or an audio item. In some embodiments, each media item can be a live-stream media item. In some embodiments, identifying the set of source video streams includes determining user behavior with respect to the set of source video streams. For example, based on the user behavior, a user of a platform (e.g., the platform 120 of FIG. 1) can be prompted to create the mosaic video stream from the set of source video streams. A confirmation of the user to create the mosaic video stream from the set of source video streams can be received by the server. In some embodiments, the user behavior can include a user switching between the set of source video streams more than a threshold number of times.

Alternatively, the processing logic can receive an identifier of each of the set of source video streams from a client device (e.g., the client device 102 of FIG. 1). For instance, using a user interface 203 of FIG. 2B as an illustrative example, the user can be presented on a media viewer (e.g., the media viewer 103 of FIG. 1) with a display of multiple media items such as media item 201A and additional media items (not shown). The user can select an option "Watch in multi-view" and then select media item 201 and one or more additional media items (e.g., by hovering a mouse and/or cursor over an area presenting a media item, clicking on a media item using a cursor, etc.).

At block 320, the processing logic combines the set of source video streams into a mosaic video stream. In some embodiments, each source video stream of the set of source video streams can occupy a corresponding spatial fragment of a predefined shape within a visual rendering of the mosaic video stream, and the video frames of the set of source video streams can be simultaneously present within the mosaic video stream. For example, using media item 201B of FIGS. 2A, 2B or FIG. 2C as illustrative examples, each of four source video streams can be simultaneously present within a mosaic video stream at a corresponding spatial fragment.

In some embodiments, each source video stream can be associated with a set of audio tracks (e.g., an English audio track, a Spanish audio track, etc.). When specifying source video streams for the mosaic video streams, a user can specify a source video stream whose audio track should be used for the mosaic video stream. Accordingly, when combining the set of source video streams into the mosaic video stream, the processing logic can incorporate the specified audio track into the mosaic video stream. Subsequently, a visual cue (e.g., a scroll bar, a button, etc.) can be optionally provided on the mosaic video stream that indicates that the audio track of the mosaic video stream is the audio track of the selected source video stream.

In some embodiments, when combining the set of source video streams into the mosaic video stream, the processing logic can verify access rights of a user of the client device with respect to each source video stream of the set of source video streams.

In some embodiments, upon receiving an identifier of each of the set of source video streams from the client device, the processing logic can determine whether any of the set of source video streams is unavailable for playback. In response to determining that at least one of the set of source video streams is unavailable for playback, the processing logic can send an error message to the client device, where the error message requests that the unavailable source video stream be replaced with a different source video stream.

In some embodiments, when combining the set of source video streams into the mosaic video stream, the processing logic can change the language of an audio track of at least one source video stream from the set of source video streams. For example, the processing logic can receive, from the client device, identifiers of a first source video stream and a second source video stream of the set of source video streams, determine the language associated with the audio track of the first source video stream, and determine that the second source video stream has a an audio track associated with the language that is different from the language of the audio track of the first source video stream. In response, the processing logic can switch the current audio track of the second source video stream to a different audio track associated with the same language as the language of the audio track of the first source video stream.

At block 330, the processing logic transmits the mosaic video stream to the client device for decoding and visual rendering within an output window. In some embodiments, as illustrated with respect to a user interface 201 of FIG. 2A, the mosaic video stream can be visually rendered (e.g., presented) on a media viewer (e.g., the media viewer 103 of FIG. 1) within a display of one or more media items. One of the media items presented for display can be the mosaic video stream. For example, with respect to FIG. 2A, a user can be presented with the mosaic video stream 201B. In some embodiments, the user can select, via the display, an option to view the mosaic video stream (e.g., by hovering a mouse and/or cursor over the area of the display presenting the mosaic video stream, clicking on the mosaic video stream using a cursor, etc.). In response, as illustrated with respect to a user interface 205 of FIG. 2C, the user can be presented on a media viewer (e.g., the media viewer 103 of FIG. 1) with a display of the mosaic video stream. With respect to FIG. 2C, the mosaic video stream can include a set of four live-stream media items that are being streamed concurrently.

In some embodiments, the mosaic video stream is presented within the output window with graphical user interface (GUI) elements. For example, the GUI elements can include one or more controls (e.g., a scroll bar, a button, etc.). The GUI elements can be selectable (e.g., to the user) to request a particular audio track of a set of audio tracks associated with a selected source video stream, a closed caption type associated with a selected source video stream, a full screen mode for a selected source video stream, a full screen mode cancelation for canceling the full screen mode for the source video stream, etc.

As discussed above, a user can request, via a corresponding GUI element, a full screen mode for a particular source video stream of the mosaic video stream. In response, a spatial fragment occupied by the specified source video stream can be expanded to a full screen mode within the visual rendering of the mosaic video stream. Subsequently, a user can request that the full screen mode be canceled. In response, the spatial fragment occupied by the specified source video stream within the visual rendering of the mosaic video stream can be restored to its corresponding original size and position.

In some embodiments, a user can select, via a corresponding GUI element, a closed caption of a closed caption type (e.g., an English caption track, a Spanish caption track, etc.) associated with a specified source video stream. In response, the closed captions of the specified closed caption type for the selected source video stream can be incorporated into the mosaic video stream.

Figure 4:
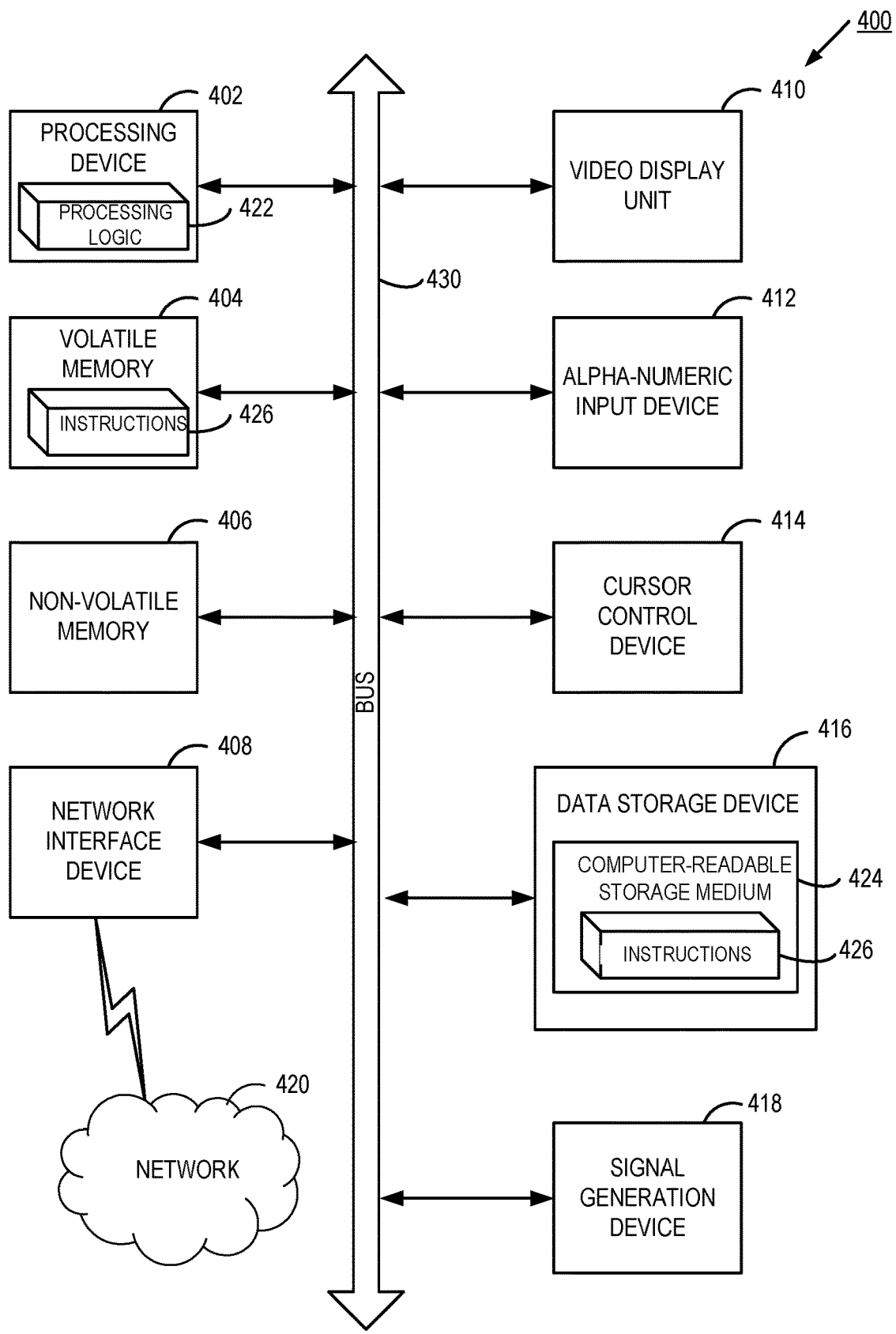
FIG. 4 is a block diagram illustrating an exemplary computer system, in accordance with implementations of the present disclosure.

FIG. 4 is a block diagram illustrating an exemplary computer system 400, in accordance with implementations of the present disclosure. The computer system 400 can correspond to platform 120 and/or client devices 102A-N, described with respect to FIG. 1. Computer system 400 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 416, which communicate with each other via a bus 430.

Processor (processing device) 402 represents one or more general-purpose processing devices such as a microprocessor, central processing unit, or the like. More particularly, the processor 402 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 can also be one or more special-purpose processing devices such as an application specific integrated circuit (ASIC), a field programmable gate array (FPGA), a digital signal processor (DSP), network processor, or the like. The processor 402 is configured to execute instructions 426 (e.g., for a server-generated mosaic video stream of live-stream media items) for performing the operations discussed herein.

The computer system 400 can further include a network interface device 408. The computer system 400 also can include a video display unit 410 (e.g., a liquid crystal display (LCD) or a cathode ray tube (CRT)), an input device 412 (e.g., a keyboard, and alphanumeric keyboard, a motion sensing input device, touch screen), a cursor control device 414 (e.g., a mouse), and a signal generation device 418 (e.g., a speaker).

The data storage device 416 can include a non-transitory machine-readable storage medium 424 (also computer-readable storage medium) on which is stored one or more sets of instructions 426 (e.g., for time stamping of media items at a platform using machine learning) embodying any one or more of the methodologies or functions described herein. The instructions can also reside, completely or at least partially, within the main memory 404 and/or within the processor 402 during execution thereof by the computer system 400, the main memory 404 and the processor 402 also constituting machine-readable storage media. The instructions can further be transmitted or received over a network 420 via the network interface device 408.

In one implementation, the instructions 426 include instructions for providing a server-generated mosaic video stream for live-stream media items. While the computer-readable storage medium 424 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   identifying, by a server, a plurality of source video streams associated with a plurality of sets of audio tracks;
   receiving an audio track selection specifying an audio track of a first set of audio tracks of the plurality of sets of audio tracks, wherein each set of audio tracks is associated with a distinct source video stream of the plurality of source video streams, and wherein the first set of audio tracks being is associated with a first source video stream selected from the plurality of source video streams;
   combining the plurality of source video streams into a mosaic video stream, wherein each source video stream of the plurality of source video streams is associated with a corresponding spatial fragment of a predefined shape within a visual rendering of the mosaic video stream, wherein a visual cue is provided for the visual rendering of the mosaic video stream that concurrently presents the plurality of source video streams, the visual cue indicating that the specified audio track of the first set of audio tracks is an audio track of the first source video stream selected from the plurality of source video streams concurrently presented within the visual rendering of the mosaic video stream; and
   transmitting the mosaic video stream to a client device for decoding and visual rendering within an output window.

2. The method of claim 1, the method further comprising:
   incorporating the specified audio track into the mosaic video stream.

3. The method of claim 1, further comprising:
   receiving, from the client device, a full screen mode selection specifying a source video stream of the plurality of source video streams; and
   expanding, to a full screen mode, a spatial fragment occupied by the specified source video stream within the visual rendering of the mosaic video stream.

4. The method of claim 3, further comprising:
   receiving, from the client device, a full screen mode cancelation command; and
   restoring, to corresponding original size and position, the spatial fragment occupied by the specified source video stream within the visual rendering of the mosaic video stream.

5. The method of claim 1, further comprising:
   receiving, from the client device, a closed caption selection specifying a closed caption type associated with the first source video stream; and
   incorporating, into the mosaic video stream, closed captions of the specified closed caption type for the first source video stream.

6. The method of claim 1, wherein combining the plurality of source video streams into the mosaic video stream is performed responsive to receiving, from the client device, identifiers of the plurality of source video streams.

7. The method of claim 1, wherein combining the plurality of source video streams into the mosaic video stream further comprises:
   verifying access rights of a user of the client device with respect to each source video stream of the plurality of source video streams.

8. The method of claim 1, wherein combining the plurality of source video streams into the mosaic video stream further comprises:
   receiving, from the client device, an identifier of the first source video stream of the plurality of source video streams;
   determining a first language associated with a first audio track of the first source video stream;
   identifying a second source video stream of the plurality of source video streams that has a second audio track associated with a second language that is different from the first language; and
   switching the second audio track associated with the second language to a third audio track associated with the first language.

9. The method of claim 1, further comprising:
   receiving, from the client device, an identifier of each of the plurality of source video streams;
   determining that one of the plurality of source video streams is unavailable for playback; and
   sending an error message to the client device, and requesting that the unavailable source video stream be replaced with a different source video stream.

10. The method of claim 1, wherein the mosaic video stream is presented within the output window with graphical user interface (GUI) elements selectable to request one or more of an audio track of a set of audio tracks associated with a selected source video stream, a closed caption type associated with a selected source video stream, a full screen mode for a selected source video stream, or a full screen mode cancelation for canceling the full screen mode for the selected source video stream.

11. The method of claim 1, wherein identifying the plurality of source video streams comprises:
   determining user behavior with respect to the plurality of source video streams;
   based on the user behavior, prompting a user to create the mosaic video stream from the plurality of source video streams; and
   receiving a confirmation of the user to create the mosaic video stream from the plurality of source video streams.

12. The method of claim 11, wherein the user behavior comprises a user switching between the plurality of source video streams more than a threshold number of times.

13. A system comprising:
a memory device; and
a processing device coupled to the memory device, the processing device to perform operations comprising:
identifying, by a server, a plurality of source video streams associated with a plurality of sets of audio tracks;
receiving an audio track selection specifying an audio track of a first set of audio tracks of the plurality of sets of audio tracks, wherein each set of audio tracks is associated with a distinct source video stream of the plurality of source video streams, and wherein the first set of audio tracks is associated with a first source video stream selected from the plurality of source video streams;
combining the plurality of source video streams into a mosaic video stream, wherein each source video stream of the plurality of source video streams is associated with a corresponding spatial fragment of a predefined shape within a visual rendering of the mosaic video stream, wherein a visual cue is provided for the visual rendering of the mosaic video stream that concurrently presents the plurality of source video streams, the visual cue indicating that the specified audio track of the first set of audio tracks is an audio track of the first source video stream selected from the plurality of source video streams concurrently presented within the visual rendering of the mosaic video stream; and
transmitting the mosaic video stream to a client device for decoding and visual rendering within an output window.

14. The system of claim 13, the operations further comprising:
incorporating the specified audio track into the mosaic video stream.

15. The system of claim 13, the operations further comprising:
receiving, from the client device, a full screen mode selection specifying a source video stream of the plurality of source video streams; and
expanding, to a full screen mode, a spatial fragment occupied by the specified source video stream within the visual rendering of the mosaic video stream.

16. A non-transitory computer readable storage medium comprising instructions for a server that, when executed by a processing device, cause the processing device to perform operations comprising:
identifying, by a server, a plurality of source video streams associated with a plurality of sets of audio tracks;
receiving an audio track selection specifying an audio track of a first set of audio tracks of the plurality of sets of audio tracks, wherein each set of audio tracks is associated with a distinct source video stream of the plurality of source video streams, and wherein the first set of audio tracks is associated with a first source video stream selected from the plurality of source video streams;
combining the plurality of source video streams into a mosaic video stream, wherein each source video stream of the plurality of source video streams is associated with a corresponding spatial fragment of a predefined shape within a visual rendering of the mosaic video stream, wherein a visual cue is provided for the visual rendering of the mosaic video stream that concurrently presents the plurality of source video streams, the visual cue indicating that the specified audio track of the first set of audio tracks is an audio track of the first source video stream selected from the plurality of source video streams concurrently presented within the visual rendering of the mosaic video stream; and
transmitting the mosaic video stream to a client device for decoding and visual rendering within an output window.

17. The non-transitory computer readable storage medium of claim 16, the operations further comprising:
incorporating the specified audio track into the mosaic video stream.

18. The non-transitory computer readable storage medium of claim 16, the operations further comprising:
receiving, from the client device, a full screen mode selection specifying a source video stream of the plurality of source video streams; and
expanding, to a full screen mode, a spatial fragment occupied by the specified source video stream within the visual rendering of the mosaic video stream.

19. The non-transitory computer readable storage medium of claim 16, the operations further comprising:
receiving, from the client device, a closed caption selection specifying a closed caption type associated with the first source video stream; and
incorporating, into the mosaic video stream, closed captions of the specified closed caption type for the first source video stream.

20. The non-transitory computer readable storage medium of claim 16, the operations further comprising:
receiving, from the client device, an identifier of each of the plurality of source video streams;
determining that one of the plurality of source video streams is unavailable for playback; and
sending an error message to the client device, and requesting that the unavailable source video stream be replaced with a different source video stream.

* * * * *